(12) United States Patent
Hansson et al.

(10) Patent No.: US 6,619,891 B2
(45) Date of Patent: Sep. 16, 2003

(54) MILLING TOOL HAVING CUTTING MEMBERS WITH DIFFERENT CLEARANCE ANGLES

(75) Inventors: Lars-Ola Hansson, Sandviken (SE); Göran Pantzar, Årsunda (SE); Inge Svenningsson, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/843,835

(22) Filed: Apr. 30, 2001

(65) Prior Publication Data

US 2001/0041105 A1 Nov. 15, 2001

(30) Foreign Application Priority Data

Apr. 28, 2000 (SE) ................................................ 0001554

(51) Int. Cl.[7] .............................. B23B 27/00; B23C 5/00
(52) U.S. Cl. .......................................... 407/35; 407/43
(58) Field of Search .............................. 407/35, 43, 40, 407/48, 53, 56, 34, 61, 51, 59

(56) References Cited

U.S. PATENT DOCUMENTS

| 4,808,044 A | * | 2/1989 | Tsujimura et al. ............ 407/42 |
| 5,083,887 A | | 1/1992 | Dotany |
| 5,368,418 A | | 11/1994 | Bentjens et al. |
| 5,586,843 A | | 12/1996 | Minicozzi |
| 5,882,150 A | | 3/1999 | Furuta et al. |
| 5,908,269 A | * | 6/1999 | Cox ............................. 407/59 |
| 5,913,644 A | * | 6/1999 | DeRoche et al. ............. 407/42 |
| 6,073,524 A | * | 6/2000 | Weiss et al. ................. 82/1.11 |

FOREIGN PATENT DOCUMENTS

| EP | 555 192 | 2/1992 |
| EP | 1 002 608 | 5/2000 |
| EP | 1 077 100 | 2/2001 |

* cited by examiner

Primary Examiner—Derris H. Banks
Assistant Examiner—Jamila Williams
(74) Attorney, Agent, or Firm—Burns, Doane, Swecker & Mathis, LLP

(57) ABSTRACT

A rotatable milling tool includes a body, and at least one set of circumferentially spaced cutting members that are intersected by a common plane oriented perpendicularly to a longitudinal center axis of the body. The set of cutting members includes at least three cutting members mounted in an envelope surface of the body. Each cutting member includes a flank surface and a cutting edge disposed adjacent to the flank surface. Each cutting edge has axially spaced apart ends. The flanked surface of each cutting member forms a clearance angle with a tangent extending through the respective cutting edge. The flank surface of the insert has a larger clearance angle than the flank surfaces of at least two other inserts in the same set. During a milling operation, the cutting members with smaller clearance angles tend to produce stability and vibration-free rotation, while the cutting member having the larger clearance angle ensures a high precision (smooth) machining.

15 Claims, 2 Drawing Sheets

MILLING TOOL HAVING CUTTING MEMBERS WITH DIFFERENT CLEARANCE ANGLES

This application claims priority under 35 U.S.C. §§119 and/or 365 to Patent Application No. 0001554-5 filed in Sweden on Apr. 28, 2000; the entire content of which is hereby incorporated by reference.

TECHNICAL FIELD OF THE INVENTION

This invention relates to a milling tool of the type that comprises a body that is rotatable around a geometrical center and has an envelope surface in which is arranged at least one set of tangentially spaced-apart cutting members. Each cutting member features a cutting edge, the ends of which are spaced apart along the axis.

BACKGROUND OF THE INVENTION

In such types of previously known milling tools for metalworking, all cutting members have one and the same clearance angle, which is generally within the range of 7–15° and frequently amounts to 10–11°. During practical milling, the ability of the tool to remove metal is often limited by the stability of the system (i.e., the cutting members, workpiece, machine tool). When milling with cutting members in the form of indexible inserts, the stability, and thereby also the ability of the milling tool to remove metal, can be improved by geometrical optimization of the rake and flank surfaces of the cutting members, i.e. by choosing optimal cutting angles. During the milling of shoulders in a workpiece, for instance, milling at angles in relation to the end face of the milling tool, in the range of 30–95°, it is necessary that the axial, radial and cutting edge angles of the cutting members be adapted to the angle which the shoulder is to have; also, the line of the cutting edge is shaped to match the shape of the shoulder which is to be generated. The optimization of the geometry of the rake and clearance angles of the cutting members in order to gain stability, and thus improved metal-removing capacity leads, however, to the fact that only one single milling tool diameter can generate the desired angle of the shoulder. In other words, the individual milling tool can only be designed with one single diameter for each purpose, in order to satisfy both the requirement for a predetermined angle of the shoulder as well as the requirement for an optimized rake and clearance geometry from a stability point of view. It should also be pointed out that, in practice, unstable milling tools give a mediocre machining precision with respect to the flatness (smoothness) of the machined surface. An unstable, vibrating milling tool thus gives rise to at least small wavy formations on the machined surface of the workpiece.

SUMMARY AND OBJECTS OF THE INVENTION

The present invention aims at obviating the above-mentioned inconveniences of previously known milling tools and at providing an improved milling tool. Thus, a primary aim of the invention is to provide a milling tool which is capable of working in a stable, substantially vibration free way, and at the same time generate machined surfaces having a high degree of flatness. It is also an aim to provide a milling tool which at a given diameter can be used for machining, for instance, different types of shoulders while at the same time maintaining good machining precision as well as a stable operation.

According to the invention, a rotatable milling tool comprises a body, and at least one set of circumferentially spaced cutting members. The body defines a longitudinal axis and includes an envelope surface. The set of cutting members includes at least three cutting members mounted in the envelope surface. Each cutting member includes a flank surface and a cutting edge disposed adjacent to the flank surface. Each cutting edge has axially spaced apart ends. The flank surface of each cutting member forms a clearance angle with a tangent extending through the respective cutting edge. One of the flank surfaces has a larger clearance angle than at least two flank surfaces in the same set.

BRIEF DESCRIPTION OF THE DRAWINGS

The objects and advantages of the invention will become apparent from the following detailed description of a preferred embodiment thereof in connection with the accompanying drawing in which like numerals designate like elements, and in which.

DETAILED DESCRIPTION OF A PREFERRED EMBODIMENT OF THE INVENTION

Figure 1:
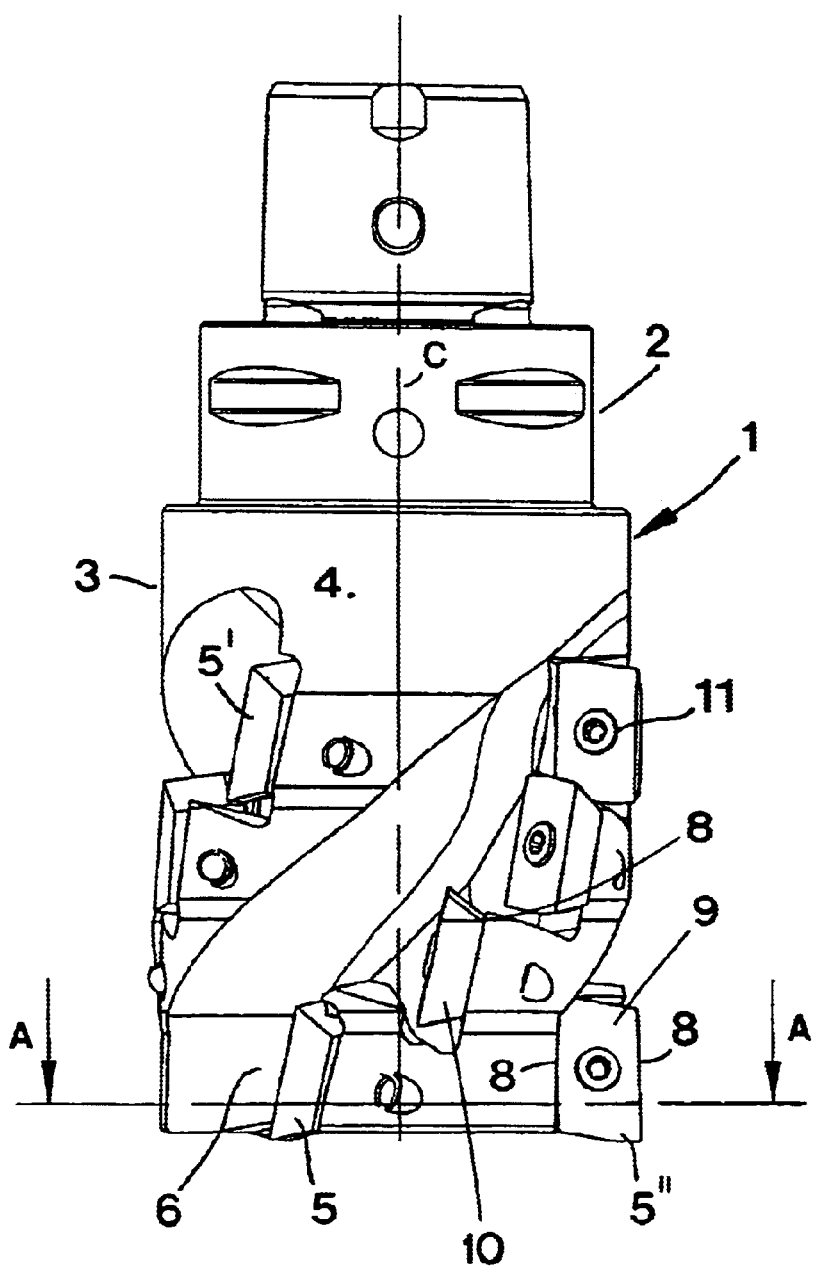
FIG. 1 is a schematic side view showing a milling tool according to the invention in the form of a long edge milling cutter.

In the drawings, there is depicted a milling tool comprising a cutter body or shell 1, which is rotatable around a geometrical centre axis C, and a plurality of indexible cutting inserts 5. In addition to a rear part 2 for attachment in a suitable tool holder, the cutter body 1 includes a front main part 3, the envelope surface 4 of which preferably has a cylindrical basic shape. However, in this connection, it should be pointed out that the part 3 could alternatively have another rotationaly symmetrical basic shape than cylindrical, e.g., conical.

Figure 2:
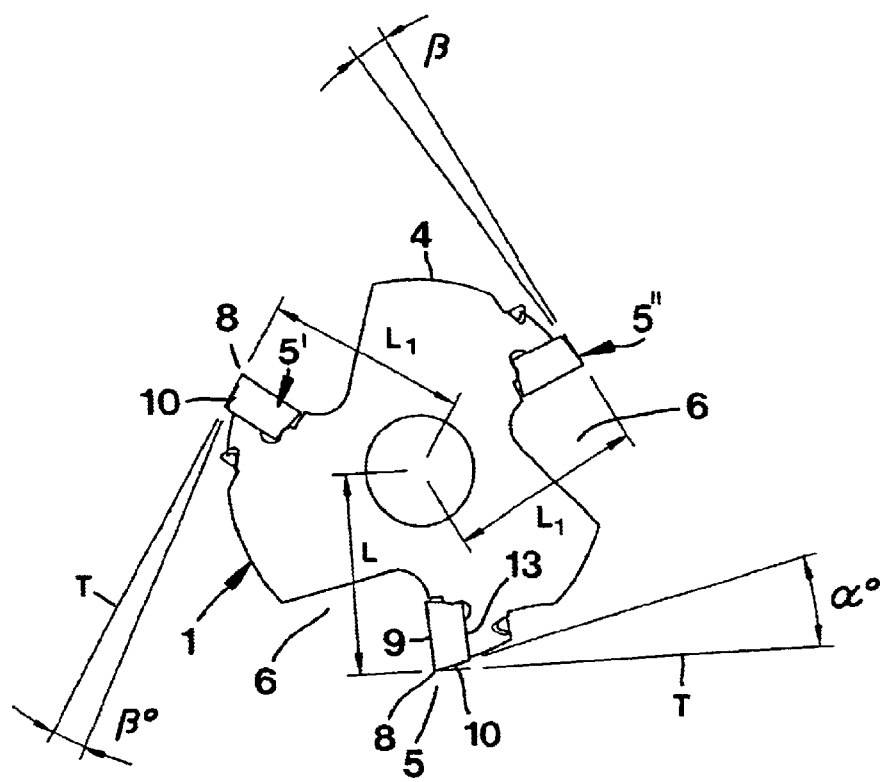
FIG. 2 is a section taken along line A—A in FIG. 1 showing an individual set of cutting members included in the tool according to FIG. 1.

In the example, the milling tool comprises a long edge milling cutter which, in a known way, includes a plurality of axially spaced-apart sets of cutting inserts which, in this case, are in the form of detachably mounted, indexible cutting inserts 5. Each set of inserts is in the form of an annular row of circumferentially spaced-apart inserts. The cutting inserts in each individual set are housed in a helicoidal recess formed along the envelope surface of the cutter body. A portion of each recess disposed in front of the inserts (with reference to the direction of rotation) serves as a chip removal channel 6. For each individual cutting insert, there is a separate seat 7 (see FIG. 3). The seats are placed in such a way that the cutting inserts in the mounted state overlap each other axially, as is clearly seen in FIG. 1. In the exemplified embodiment, the tool includes four sets of inserts having three individual cutting inserts in each set. Thus, any plane oriented perpendicular to the center axis C will intersect three circumferentially spaced cutting inserts 5, 5', 5" (see FIG. 2). These three inserts can either be exactly situated in one and the same axial position in the common plane or be somewhat displaced in relation to each other in the axial direction to partly overlap each other during operation.

Each individual cutting insert 5 has an active cutting edge 8 situated between a rake surface 9 and a flank or clearance surface 10 of the insert. The rake surface 9 faces generally in the direction of rotation, and the flank surface 10 faces generally radially outwardly, as is evident from FIG. 2. When the cutting insert is indexable, as in the example, the insert has two opposite, substantially parallel edges 8. In practice, the individual cutting edge can either be straight or slightly helicoidal in order to, depending on the cutting edge angle of the cutting inserts, follow the generally cylindrical or rotationally symmetrical basic shape of the milling cutter body. Each individual cutting insert can advantageously be secured in the appurtenant seat 7 by means of a screw 11.

Figure 3:
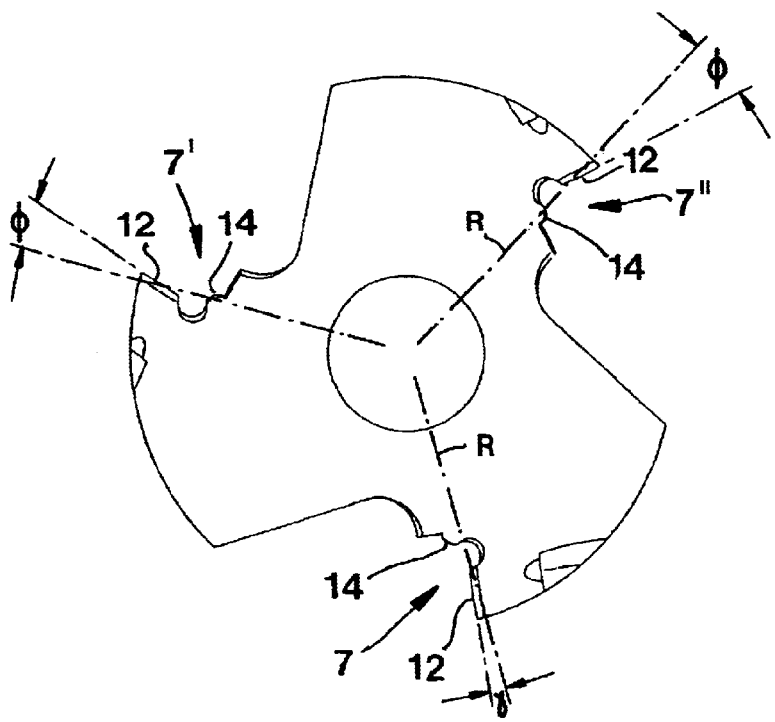
FIG. 3 is a slightly perspectively illustrated, enlarged end view of the milling cutter body itself, the cutting members having been removed from the appurtenant seats in the cutter body.

As can be seen in FIG. 3, each individual seat 7 is, in the main, defined by a bottom surface 12 against which the bottom side 13 (see FIG. 2) of the cutting insert is pressable to determine a circumferential position of the cutting insert relative to the cutter body, as well as an abutment surface 14 against which an inactive flank surface 5 of the cutting insert can be pressed in order to determine the radial position of the cutting insert relative the cutter body.

As disclosed so far, the long edge milling cutter is in all essentials previously known (see for instance U.S. Pat. No. 5,083,887, U.S. Pat. No. 5,586,843, U.S. Pat. No. 5,882,150 and U.S. Pat. No. 5,913,644).

Before the novel aspects of the invention are described in detail, it should be emphasized that the general idea according to the invention is also applicable to milling cutters that include only one set of tangentially (circumstantially) spaced-apart cutting inserts arranged in a common plane, as well as to the below-disclosed cutter having more than one set.

Characteristic of the invention is that at least one of the cutting inserts 5, 5', 5" of a set of circumferentially spaced cutting inserts has a different clearance angle than the other inserts of the set. More precisely, one of the cutting inserts, i.e., the cutting insert 5, has a clearance angle $\alpha$ which is larger than the clearance angle $\beta$ of the other cutting inserts 5', 5" of the same set. The clearance angle should, in the usual way, be understood as being the angle which is formed between the flank surface 10 of the insert and a tangential line T extending through the cutting edge 8. The angle $\alpha$ of the cutting insert 5 is preferably within the range of 5–25°, and more preferably within the commonly accepted range of 7–15°. Most preferably, the clearance angle $\alpha$ can amount to 10 to 11°. The clearance angle $\beta$ of the other two cutting inserts 5', 5" should, in turn, be within the range of 0.5–5°; preferably 1–4°. In practice, the clearance angle $\alpha$ is more preferably 2 to 3°. In this connection, it should be pointed out that the above mentioned clearance angles are applicable regardless of whether the cutting inserts have straight cutting edges and planar flank surfaces, or curved cutting edges and bent flank surfaces.

In the preferred embodiment of the invention, the cutting insert 5 which has the largest clearance angle $\alpha$ is located or made in such a way that the distance L between the cutting edge 8 and the center axis C of the milling cutter body is somewhat larger than the corresponding distance L, between the center axis and the cutting edges of the two other cutting inserts 5', 5" which have the smaller clearance angle $\beta$. In practice, the difference between the values L and $L_1$ is small, although clearly distinctive. More precisely, the difference in distance should be within the range of 0.01–0.08 mm, preferably 0.03–0.06 mm and more preferably 0.05 mm.

In the disclosed preferred embodiment, the different clearance angles $\alpha$ and $\beta$ and the different distances L, L' have been achieved by the use of identically shaped cutting inserts mounted in differently configured seats. Alternatively, the reverse would be possible, i.e., adding differently shaped inserts mounted in identically shaped seats. Thus, in the preferred embodiment the cutting inserts 5,5',5" of the same set have the same geometry, while the seats 7 have a varying design. In FIG. 3 it is illustrated how the seat 7 for the cutting insert 5 having the larger clearance angle $\alpha$ is formed with a bottom surface 12 extending at a comparatively small seat angle $\gamma$ to a radial line R that intersects a midpoint on the bottom surface of the seat 7, whereas the corresponding bottom surface 12 of the seats 7', 7" for the cutting inserts 5', 5" extends at a steeper (larger) seat angle $\phi$ to the respective radial lines R. Furthermore, the abutment surface 14 at the seat 7 is located at a longer radial distance from the center axis C of the milling cutter body than the radial distance between the center axis and the abutment surfaces 14 of the seats 7', 7". In this way, it is guaranteed that the edge 8 of the cutting insert 5 is located at a somewhat longer distance from the center axis than the corresponding edges of the cutting inserts 5', 5". Thanks to the bottom surfaces 12 of the seats 7', 7" extending at a steeper angle to the appurtenant radial plane R than the bottom surface 12 of the seat 7, the two cutting bodies 5', 5" will, when mounted in their seats, be angled somewhat forwards in comparison with the cutting insert 5 and in this way will have their flank surfaces 10 thereof disposed at the smaller clearance angle $\beta$.

Because all cutting inserts have an identical shape, it is simpler to store, inventory, exchange, and replace them.

Function and Advantages of the Invention

When milling with the milling tool according to the invention, the cutting inserts 5', 5" having a reduced clearance angle will tend to dampen vibrations when the tool turns in relation to the machined surface of the work piece, and thereby guarantee stability in the tool. On the other hand, the cutting insert 5 with the largest clearance angle works with an easier cutting action for guaranteeing the requisite machining precision. Expressed in other words, the cutting insert 5 having the maximum largest clearance angle is so situated due to its radial angle, axial rake angle and setting angle that the resulting tool geometry generates the desired final form of a machined, plane surface or shoulder. Thus, the cutting insert 5 having the largest clearance angle generates a smooth, flat plane surface with a predetermined angle in relation to the end face of the milling tool. The other cutting inserts in the tool, i.e. the cutting inserts 5, 5" having the reduced clearance angles have, in turn, the role of meeting the requirements for optimum stability, i.e., a vibration-free operation, without themselves giving the desired final precision in respect of the flatness of the machined surface.

Feasible Modifications of the Invention

The invention is not solely restricted to the embodiment described above and shown in the drawings. Thus, the invention can be applied not only in connectionwith long edge milling cutters, but also to other milling tools, e.g., square shoulder facemills, of the type that includes one set of tangentially spaced-apart radial cutting inserts. Although the invention has been exemplified in connection with such milling tools that include detachably mounted cutting inserts, in particular indexible cutting inserts, the invention is also applicable to tools having fixed, e-g., brazed cutting inserts. It is even feasible to form the requisite cutting members, particularly the cutting edges, integrally with the milling body if this body is made of a hard material, e.g., cemented carbide. In other words, the expression "cutting member" as used herein should be interpreted in the broadest sense and be regarded as including not only a separately manufactured cutting insert (irrespective of whether it is detachably mounted or brazed-in), but also a cutting structure which is integrally formed in the actual milling body. As also has been pointed out above, the general idea according to the invention can also be realized by means of suitable formed cutting inserts of different types, which are mounted in identically formed and located seats. In the disclosed embodiment, only three cutting members are shown in each set of cutting members (e.g., the tool could include 10 to 20 cutting members). In practice, the number of cutting members of a set can be considerably larger than only three. In such cases, more than one cutting member in each set could have the larger clearance angle, while other cutting members in the set would have reduced clearance angles. In all events, however, the number of cutting members having the largest clearance angle should be less than the number of cutting members having the reduced clearance angle. Within the scope of the invention, it is even feasible to equip the milling cutter body with cutting members that have more than two clearance angles of different sizes.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A rotatable milling tool comprising:
   a body defining a longitudinal center axis and including an envelope surface having circumferentially spaced chip-removal channels formed therein, a seat formed in each channel, each seat including a bottom surface forming a seat angle with respect to a radial line extending through a midpoint of the seat; and
   at least one set of detachable cutting inserts mounted in respective channels and intersected by a common plane oriented perpendicular to the axis of rotation, the set including:
      at least three cutting inserts of identical size and configuration, each cutting insert being mounted in a seat of a respective channel such that a bottom side of the insert abuts the bottom surface of the respective seat, each cutting insert including a cutting edge disposed adjacent a flank surface of the insert, each cutting edge having axially spaced-apart ends,
      the flank surface of each cutting insert forming a clearance angle with a tangent extending through the respective cutting edge, one of the flank surfaces having a larger clearance angle than at least two other flank surfaces in the same set,
      the clearance angle of the flank surface having the larger clearance angle being in a range of 5–25°, and the clearance angle of each of the at least two other flank surfaces being in a range of 0.05–5°,
      the seat angle of the seat which abuts the cutting insert with the larger clearance angle being different from the seat angles of the bottom surfaces which abut the at least two other cutting inserts,
      the cutting edge of the cutting insert with the larger clearance angle being spaced farther from the center axis than are the cutting edges of the at least two other cutting inserts.

2. The rotatable milling tool according to claim 1, wherein the cutting edge of the cutting insert with the larger clearance angle being spaced by 0.01–0.08 mm farther from the center axis than are the cutting edges of the at least two other cutting inserts.

3. A rotatable milling tool comprising:
   a body defining a longitudinal center axis and including an envelope surface; and
   at least one set of at least three circumferentially spaced cutting members disposed in the envelope surface, each cutting member including a flank surface and a cutting edge disposed adjacent to the flank surface, each cutting edge having axially spaced-apart ends,
   the flank surface of each cutting member forming a clearance angle with a tangent extending through the respective cutting edge,
   one of the flank surfaces having a larger clearance angle than at least two other flank surfaces in the same set,
   wherein the clearance angle of the flank surface having the larger clearance angle being in a range of 5–25°, and the clearance angle of each of the at least two other flank surfaces being in a range of 0.5–5°.

4. The rotatable milling tool according to claim 3, wherein the first clearance angle lies in a range of 7–15 degrees, and each second clearance angle lies in a range of 1–5°.

5. The rotatable milling tool according to claim 3, wherein each cutting member comprises a detachable cutting insert.

6. The rotatable milling tool including to claim 5, wherein all of the cutting inserts are of identical size and configuration.

7. The rotatable milling tool according to claim 6, wherein the envelope surface includes circumferentially spaced chip-removal channels found therein, and a seat formed in each channel for supporting a respective cutting insert, each seat including a bottom surface for abutting a bottom side of the respective cutting insert, each bottom surface forming a seat angle with respect to a radial line extending through a midpoint of the seat, the seat angle of the seat which abuts the cutting insert having the larger clearance angle being different from the seat angle of the bottom surfaces which abut the bottom sides of the at least two other cutting inserts.

8. The milling tool according to claim 3, wherein the cutting edge of the cutting members with the larger clearance angle is spaced farther from the center axis than are the cutting edges of the at least two other cutting members.

9. The milling tool according to claim 3, wherein the cutting edge of the cutting member with the larger clearance angle is spaced by 0.01–0.08 mm farther from the center axis than are the cutting edges of the at least two other cutting members.

10. The milling tool according to claim 3, wherein the cutting edge of the cutting member with the larger clearance angle is spaced by 0.03–0.06 mm farther from the center axis than are the cutting edges of the at least two other cutting members.

11. The milling tool according to claim 3, wherein there are exactly three cutting members in the set, the clearance angles of the two cutting members having the smaller clearance angle being equal to one another.

12. A rotatable milling tool comprising:
    a body defining a longitudinal center axis and including an envelope surface; and
    at least one set of at least three circumferentially spaced cutting members disposed in the envelope surface, each cutting member including a flank surface and a cutting edge disposed adjacent to the flank surface, each cutting edge having axially spaced-apart ends,
    the flank surface of each cutting member forming a clearance angle with a tangent extending through the respective cutting edge,
    one of the flank surfaces having a larger clearance angle than at least two other flank surfaces in the same set, wherein all of the cutting inserts are of identical size and configuration, and further wherein the envelope surface includes circumferentially spaced chip-removal channels formed therein, and a seat formed in each channel for supporting a respective cutting insert, each seat including a bottom surface for abutting a bottom side of the respective cutting insert, each bottom surface forming a seat angle with respect to a radial line extending through a midpoint of the seat, the seat angle of the seat which abuts the cutting insert having the larger clearance angle being different from the seat angle of the bottom surfaces which abut the bottom sides of the at least two other cutting inserts.

13. A rotatable milling tool comprising:

a body defining a longitudinal center axis and including an envelope surface; and at least one set of at least three circumferentially spaced cutting members disposed in the envelope surface, each cutting member including a flank surface and a cutting edge disposed adjacent to the flank surface, each cutting edge having axially spaced-apart ends, the flank surface of each cutting member forming a clearance angle with a tangent extending through the respective cutting edge, one of the flank surfaces having a larger clearance angle than at least two other flank surfaces in the same set, wherein the cutting edge of the cutting members with the larger clearance angle is spaced farther from the center axis than are the cutting edges of the at least two other cutting members.

14. A rotatable milling tool comprising:

a body defining a longitudinal center axis and including an envelope surface; and at least one set of at least three circumferentially spaced cutting members disposed in the envelope surface, each cutting member including a flank surface and a cutting edge disposed adjacent to the flank surface, each cutting edge having axially spaced-apart ends, the flank surface of each cutting member forming a clearance angle with a tangent extending through the respective cutting edge, one of the flank surfaces having a larger clearance angle than at least two other flank surfaces in the same set, wherein the cutting edge of the cutting member with the larger clearance angle is spaced by 0.01–0.08 mm farther from the center axis than are the cutting edges of the at least two other cutting members.

15. A rotatable milling tool comprising:

body defining a longitudinal center axis and including an envelope surface; and at least one set of at least three circumferentially spaced cutting members disposed in the envelope surface, each cutting member including a flank surface and a cutting edge disposed adjacent to the flank surface, each cutting edge having axially spaced-apart ends, the flank surface of each cutting member forming a clearance angle with a tangent extending through the respective cutting edge, one of the flank surfaces having a larger clearance angle than at least two other flank surfaces in the same set, wherein the cuffing edge of the cutting member with the larger clearance angle is spaced by 0.03–0.06 mm farther from the center axis than are the cutting edges of the at least two other cutting members.

* * * * *